United States Patent Office 3,041,229
Patented June 26, 1962

3,041,229
METHOD OF FILLING HOLLOW SHAPES
George M. Moisson, Jr., Palos Verdes Estates, Calif., assignor to Northrop Corporation, a corporation of California
No Drawing. Filed Jan. 20, 1958, Ser. No. 709,742
3 Claims. (Cl. 156—80)

This invention relates to fabricating hollow structures having voids, cavities or compartments therein and filling them with a precompressed, but expandable core material.

This invention is applicable under extremes of environment and to many trades and uses. It would be useful in the fabricating of structures that are designed to insulate against sound and/or temperature. Application could be found in the aircraft industry where great stability of structure is desired. The list of uses may be indefinitely multiplied.

However, the aircraft industry is to be here considered in order to provide a suitable example. At the present time honeycomb core material, in the form of various metal alloys and materials is being extensively used to provide stability in certain structures. The problems coupled with the material are many and varied. It is very expensive material; it is extremely difficult to machine; bonding the material to aircraft skin structure is difficult and questionable. A by-product of the problems is the cost of the tooling that is required to solve the problems. Many hours devoted appear astronomical.

Therefore, it is an object of this invention to provide a method of filling hollow shapes by expanding a precompressed core material in the voids or cavities.

Another object of this invention is to provide a material to fill voids or cavities by a method that is reasonably inexpensive. The material is very easily machined; is readily bonded to the structure that defines the void or cavity; and requires few man hours to accomplish the end result.

Briefly the invention comprises the method of compressing a foamed resin by subjecting it to heat and pressure. The resin is retained in the compressed state by reducing the temperature and then it may or may not be machined to a particular configuration. An adhesive is applied to the surfaces of the compressed resin, if desired and needed, and the prepared material is placed in a void or cavity of a fabricated, hollow structure. The entire structure with the resin in place is then heated which results in expanding the foamed resin to fill the void or cavity. Once the cavity is filled, the resin may be further heated, to cure the adhesive that has bonded the resin to the structure, providing the adhesive is of the type that requires such additional steps.

A more detailed description of the invention follows: A foamed epoxy resin is heated to a temperature of 310° to 330° F. The particular resin involved is that which results when epichlorohydrin is reacted with Bisphenol A or dihydric phenol. The resulting epoxy resin is expanded by use of a chemical blowing agent to create a foam, which is cured to a solid thermoset state at the point of maximum expansion. The foamed resin constitutes a material that has entrapped air or gas bubbles therein. Foamed epoxy resin is a readily available commercial material. A characteristic of most if not all foamed resins and particularly the one previously defined is that it can be compressed, in all directions, to a fraction of its fully expanded condition.

After the foamed epoxy resin is heated it is compressed to the size desired and within the limits of the physical properties. Once compressed, the temperature is reduced to 70° F. to 120° F. resulting in freezing the compressed resin. In the frozen state the resin retains its compressed condition and additionally displays resilient properties.

Attention is directed to the fact that the foamed epoxy resin is compressed, not deformed.

The compressed resin material may or may not be machined into a particular shape and configuration. The end product will determine whether this step is carried out.

Prior to placing the compressed material into a void or cavity of a previously prepared structure an adhesive is applied to all or a part of the surfaces. Again, the adhesive selected will be determined by the final end product and structure and its application. However, it is assumed here that the adhesive to be used will remain in a tacky state to a temperature to and between 200° F. to 215° F. Such adhesives are well known in the art.

As stated, the compressed material is placed in a void or cavity. The structure, with the resin in place, is heated to a temperature of 210° to 215° F. which results in the compressed material reexpanding. However, for best results the structure should restrict the expansion to 85% to 95% of its possible total. However, here again the final end product will determine the amount of reexpansion. The temperature should be maintained for approximately an hour.

At the end of an hour's time the temperature should be increased to a temperature of approximately 250° F. in order to cure the adhesive. A ninety minute cure time is recommended, but is not mandatory, again being dependent on the type of adhesive and its particular curing temperature.

The assembly which constitutes the structure and reexpanded adhered foam is removed from the heated environment and allowed to cool below 130° F.

The initial foam is free of internal stress, and filled with closed-cell bubbles of gas generated by the blowing or foaming agent. After heating and compressing, the foam remains intact, but the bubbles assume a flattened shape; as a result of which, the slab of resin develops some flexibility or resiliency. Upon reexpanding, the cells try to assume their original size and shape due to "plastic memory" and to the expansive forces of the entrapped gases.

Briefly in summary the method of performing the invention is as follows: Foamed epoxy resin is heated to 310° F. to 330° F. and compressed. The temperature is reduced to between 70° to 120° F. which freezes the material. An adhesive is applied to the desired surfaces, after machining a contour or shape if desired, and reheated to 210° to 215° F. to cause reexpansion. Reheating, of course, occurs after the compressed foam is placed in a void or cavity of a structure. The last specified temperature is maintained for approximately an hour. Further heating to a temperature of 250° F. for approximately ninety minutes cures the adhesive. However, a temperature below the charring point of the resin is to be determined and maintained. Once the adhesive has cured the temperature is reduced to about 130° F. and the assembly is ready to be placed in use.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. The method of filling hollow shapes comprising heating a completely foamed epoxy resin; compressing said resin; reducing the temperature of the resin until it assumes a frozen condition in its compressed state and applying an adhesive to the surfaces thereof; placing said resin within a hollow area of a fabricated structure;

and heating the resin to cause expansion thereof and to fill the hollow area and bond to the fabricated structure.

2. The method of filling hollow shapes comprising heating a completely foamed epoxy resin to a temperature at which said resin can be compressed without damage thereto; compressing said heated resin; reducing the temperature of the resin until it assumes a frozen condition in its compressed state and applying an adhesive to the surfaces thereof; placing said resin within a hollow area of a fabricated structure; heating the resin to cause expansion thereof and to fill the hollow area and bond to the fabricated structure; and heating said expanded resin and structure until the adhesive cures.

3. The method of filling hollow shapes comprising heating a quantity of completely foamed epoxy resin having a predetermined volume to a temperature at which said resin can be compressed without damage thereto; compressing said resin to reduce the volume thereof to a volume less than said predetermined volume; reducing the temperature of the resin until it assumes a frozen condition in its compressed state and applying an adhesive to the surfaces thereof; placing said resin within a hollow area of a fabricated structure; heating the resin to cause expansion thereof and to fill the hollow area and bond to the fabricated structure; and further heating the expanded resin and structure until the adhesive cures.

References Cited in the file of this patent

UNITED STATES PATENTS

| | | |
|---|---|---|
| 2,384,387 | Meyer | Sept. 4, 1945 |
| 2,533,609 | Nolan | Dec. 12, 1950 |
| 2,623,023 | Koroly | Dec. 23, 1952 |
| 2,860,378 | Urchick | Nov. 18, 1958 |

FOREIGN PATENTS

| | | |
|---|---|---|
| 711,771 | Great Britain | July 14, 1954 |